(12) United States Patent
Quintana et al.

(10) Patent No.: US 6,671,893 B1
(45) Date of Patent: Jan. 6, 2004

(54) TOILET AND URINAL LEAK, OVERFLOW AND STUCK VALVE PREVENTION SYSTEM

(75) Inventors: Richard Quintana, Westminster, CA (US); Devon Niccole, Huntington Beach, CA (US)

(73) Assignee: Nicole Family Trust, Huntington Beach, CA (US)

( * ) Notice: Subject to any disclaimer, the term of this patent is extended or adjusted under 35 U.S.C. 154(b) by 0 days.

(21) Appl. No.: 10/321,931

(22) Filed: Dec. 17, 2002

(51) Int. Cl.[7] .............................................. E03D 11/00
(52) U.S. Cl. .......................................................... 4/427
(58) Field of Search ............................... 4/427; 137/486

(56) References Cited

U.S. PATENT DOCUMENTS 5,782,263 A * 7/1998 Isaacson et al. ......... 137/487.5
6,052,841 A * 4/2000 Mankin et al. ................. 4/427
6,058,519 A    5/2000 Quintana ........................ 4/427
6,178,569 B1   1/2001 Quintana ........................ 4/427
6,367,096 B1   4/2002 Quintana ........................ 4/427
2003/0145371 A1 * 8/2003 Ghertner et al. ............... 4/427

* cited by examiner

*Primary Examiner*—Charles E. Phillips
(74) *Attorney, Agent, or Firm*—James G. O'Neill; Klein, O'Neill & Singh, LLP

(57) ABSTRACT

A system for insertion in a water line to a toilet bowl or urinal includes a housing having a water flow sensor held therein and a toilet or urinal overflow detector held in or formed integrally with the toilet bowl or urinal. The housing includes a normally-open valve actuated by the water flow detector or overflow detector to control flow of water through water line. The system may also include a water cleaner cartridge system.

20 Claims, 2 Drawing Sheets

TOILET AND URINAL LEAK, OVERFLOW AND STUCK VALVE PREVENTION SYSTEM

BACKGROUND OF THE INVENTION

1. Field of the Invention

This invention relates generally to toilet overflow and leak prevention devices, and more particularly, to devices adapted to be mounted in or to a water line to a toilet or urinal, having no water tank, for detecting and shutting off any leaks or stuck flush valves, and/or controlling overflow of water from a toilet bowl or urinal.

2. Description of Related Art

As homeowners and those who work in and around certain types of facilities, such as convalescent or retirement homes, office buildings, restaurants, and the like, are aware, toilet bowls and urinals may leak or overflow for any number of reasons, such as becoming blocked or worn, valves becoming stuck in the open position, or by a person repeatedly flushing the same to cause it to overflow. The leaking or overflow of water may cause serious problems, for any number of reasons, and the waste of water caused thereby is becoming increasingly more serious because of the growing need to conserve water.

Many patents have disclosed mechanical and electrically operated water overflow control devices to prevent the overflowing of toilets and/or toilet tanks. Examples of such patents include U.S. Pat. Nos. 6,058,509 and 6,178,569 in the name of Richard Quintana, one of the inventors named herein. Additionally, U.S. Pat. No. 6,367,096 to Richard Quintana discloses a system that detects water leaks and shuts off the flow of water to a toilet. The devices disclosed in these patents work well for their intended purposes, but fail to disclose or teach overflow, leak and stuck valve prevention systems, of the type disclosed herein.

The present invention incorporates one or more devices formed integrally with or removably held in a toilet bowl or a urinal to detect and prevent overflows, and an automatically operated shut-off device held in a water line to the toilet bowl or urinal having means to sense the flow of water and to accurately measure and control the flow of water to the toilet bowl or urinal, in a more expeditious, reliable and cheaper manner.

SUMMARY OF THE INVENTION

Accordingly, it is a general object of the present invention to provide an improved and simplified toilet and urinal leak, overflow and stuck valve prevention system. It is a particular object of the present invention to provide an improved and simplified flow detection and overflow prevention system connected in a water line. It is yet another particular object of the present invention to provide an improved and simplified water flow control and overflow prevention system for a toilet bowl or urinal. It is a further particular object of the present invention to provide an improved and simplified system, having one or more detecting sensors inserted in or near the rim of a toilet bowl or urinal and connected to an actuator for a valve means to control flow of water to the toilet bowl or urinal. It is still another particular object of the present invention to provide an improved and simplified overflow control device having a plurality of sensing means attached at a rim of a toilet bowl or urinal and which is electrically connected to a normally open valve means for selectively controlling the flow of water to the toilet bowl or urinal. It is a still further particular object of the present invention to provide an improved and simplified flow control device having an actuator for a valve means, connected to sensors mounted at a rim of a toilet bowl or urinal to prevent overflows, and with further means to detect leaks or a stuck valve in a water line. It is yet another particular object of the present invention to provide an improved and simplified flow control and leak detection system that prevents leaks and overflows and allows stuck valves to be reset. And, it is another particular object of the present invention to provide an improved and simplified system having a water overflow prevention device incorporated in or to a toilet bowl or urinal and a flow measuring device or sensor that operate a shutoff valve a predetermined number of times before finally or completely stopping flow of water and activating an alarm.

These and other objects and advantages of the present invention are achieved by providing a system held in water line to a toilet bowl or urinal. The system includes water flow sensing means and means connected to overflow detecting means held in the toilet bowl or urinal, for operation of a normally-open valve to control flow of water to the toilet bowl or urinal from a flush valve.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

DESCRIPTION OF THE PREFERRED EMBODIMENTS

Figure 1:
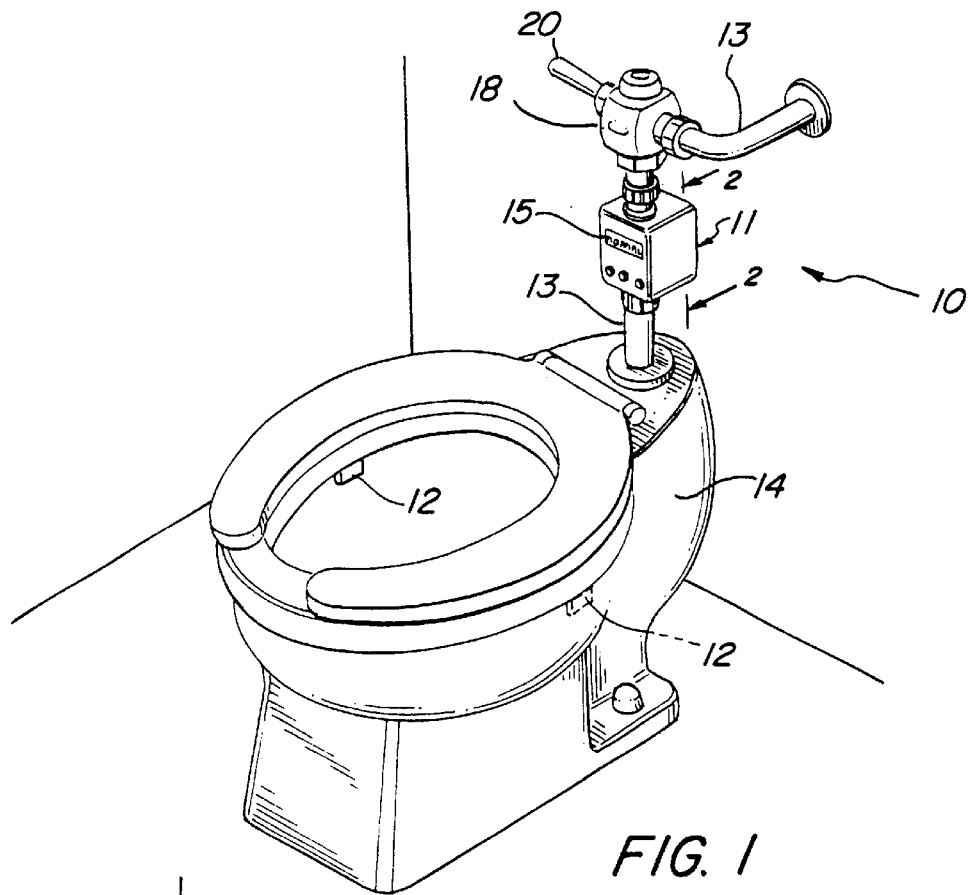
FIG. 1 is a perspective view of a leak, overflow and stuck valve prevention system of the present invention shown mounted in a water line to a toilet bowl.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for an improved and simplified toilet and urinal leak, overflow and stuck valve prevention system.

A first embodiment of a system of the present invention is generally indicated at 10 in FIGS. 1–4, and is comprised of a housing 11 that cooperates with one or more water level sensors 12, in any known manner, such as by electric wires, infrared, microwave, etc. The sensors 12 are formed or held in or near the rim of a toilet bowl or urinal 14. The housing 11 is mounted in a water line 13 and includes an operating system having a controller or microprocessor, a control display 15, a flow detection means or sensor 17 and a flow control valve 16 to measure and control the flow of water to the toilet bowl or urinal 14. The sensors 12 may be of any available type, such as those set forth in U.S. Pat. No. 6,178,569, the disclosure of which is incorporated herein by this reference thereto.

The water line 13 to the toilet bowl or urinal 14 includes a flush valve 18, of any type known to those skilled in the art, operated by any known means 20, such as a lever, a pushbutton or other manual-type actuation means, or an electric eye, motion detector, or other type of automatic actuation means.

Additionally, although the housing 11 and control valve 16 are preferably mounted downstream of the flush valve 18, they could formed integrally with or be located upstream of the flush valve in certain installations.

Figure 2:
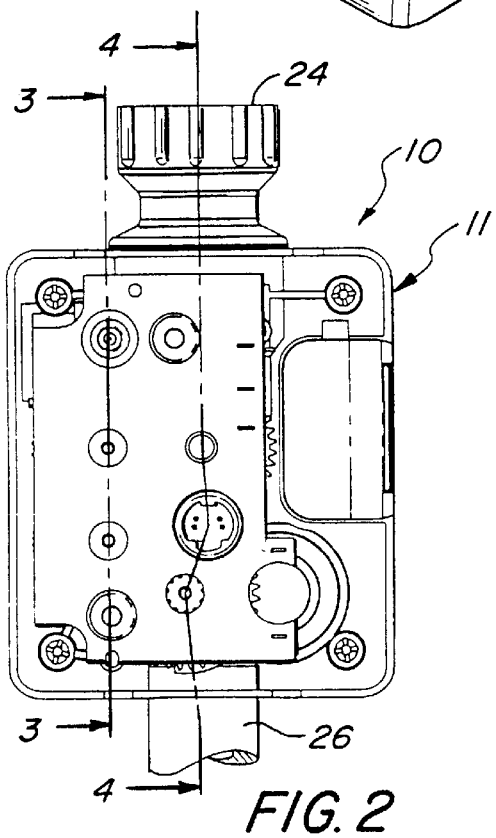
FIG. 2 is a cross-sectional view of the leak, overflow and stuck valve prevention system of FIG. 1, taken along line 2–2.
Figure 3:
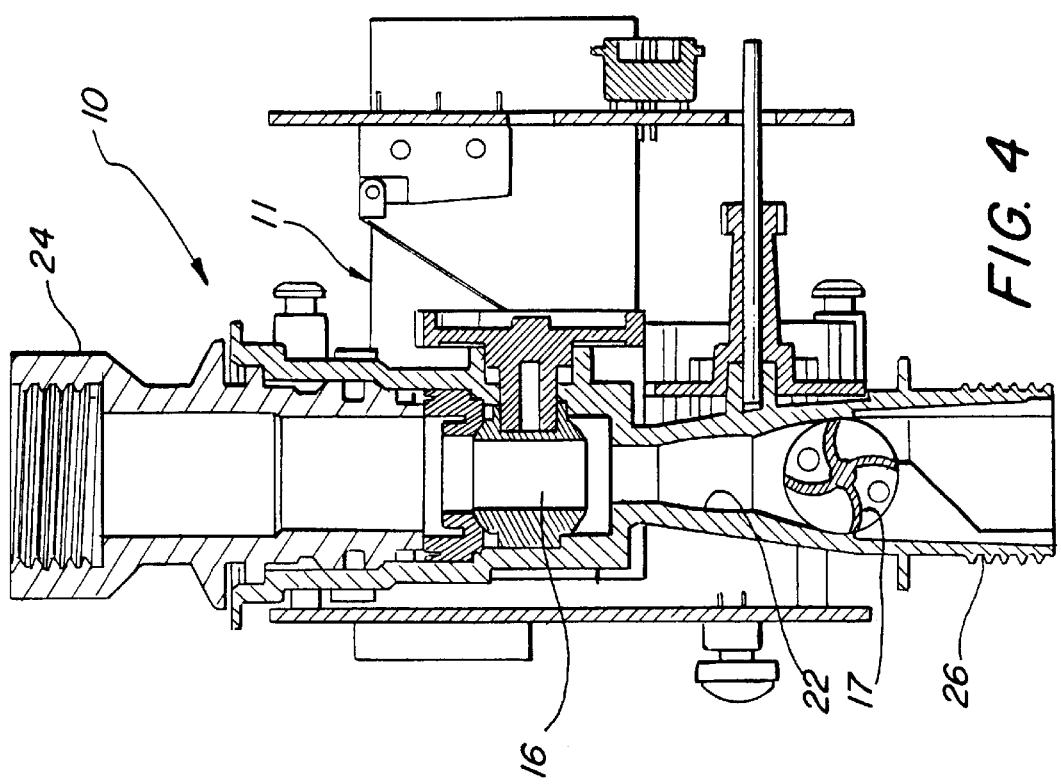
FIG. 3 is an enlarged partial cross-sectional view of the leak, overflow and stuck valve prevention system of FIG. 1.
Figure 4:
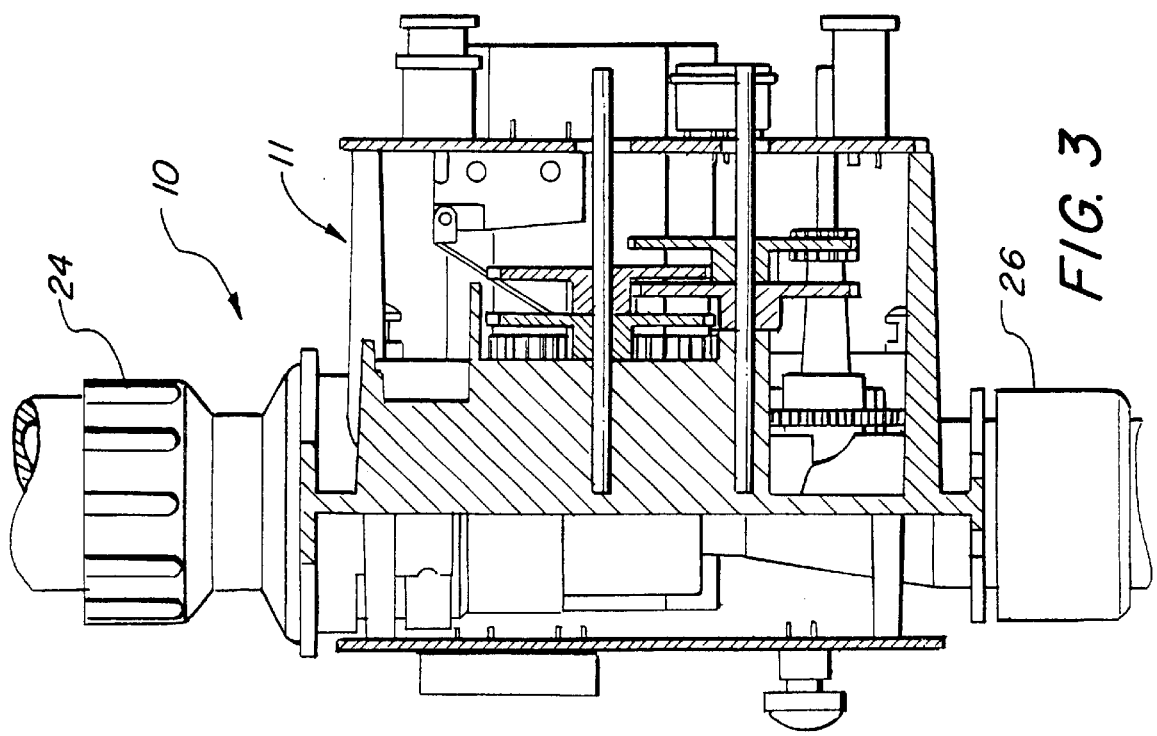
FIG. 4 is a further enlarged partial cross-sectional view of the leak, overflow and stuck valve prevention system of FIG. 1.

As best shown in FIGS. 2–4, the operating system, flow detection system 17 and flow control valve 16 in housing 11 include a driving means, such as a motor and gears, or a solenoid to actuate a normally open valve between an open position shown in FIG. 4 and a closed position. The valve 16 may be a ball or other type control valve, such as a butterfly, flap or the like, to control flow of water through the housing and to the toilet bowl or urinal 14.

The housing 11 may include other various features, such as one or more circuit boards and related circuitry held internally, a valve closed alarm and/or indicator light, a power supply, a test button, the control display or screen 15, and other buttons or features, as needed. For example, the system might include a reset button, a silence button and a code button, to enable an authorized user to enter an authorization code to reactivate the system after it is finally or permanently closed, as described below.

The operation of the device or system 10 of the present invention will now be described. The system is designed to shut off flow of water to any toilet or urinal bowl if an overflow condition is detected. The system is also designed as a water conservation device to detect leaks and shut off flow, as described below, and to correct or reset/re-orientate flush valves that might get stuck in the open position from time to time, or that might leak because of worn diaphragms. As explained, the system 10 includes a controller or microprocessor in the housing 11 to control operation of the system.

As shown in FIG. 4, the housing 11 of the present invention includes the flow detection or sensor means 17 held in a conduit or passageway 22 passing through the housing and connecting an inlet 24 and an outlet 26. The flow detection or sensor means 17 may take any desired or known form, such as an infrared or other light sensing system, a paddle wheel, turbine blade or other mechanical measuring system. The sensor 17 is mounted in the passageway 22 so as to detect water flow through the housing after flushing of the system, or any flow if the valve 16 is worn, or otherwise leaks or is held in a partially or fully open position. The water traveling through the passageway is sensed by the light, or will rotate or turn the paddle wheel or turbine blade 17 so as to send a signal to the controller or microprocessor in the housing 11. The length of time water flows by the sensor 17 is measured. And, if the flow of water continues for too long a time period, i.e., exceeds a first pre-selected time limit set for a normal flush, the controller will operate the control valve 16 to shut off the water supply to the toilet bowl or urinal 14. The first time limit may be varied or changed, as desired, for example, from about 2.5 seconds to about 3.5 seconds, depending on the water pressure and other parameters.

After the control valve 16 is operated to cut off flow of water to the toilet bowl or urinal, the system will record or recognize this as a first flow alert or count. If the valve 16 was closed because of a stuck open flush valve 18, it is hoped that the closing of the valve 16 will reset the flush valve to its normal operating position. Therefore, the controller will automatically reopen the valve 16 after a second pre-selected period of time, for example, 5 seconds. If water continues to flow past the flow detector for the first pre-selected time limit mentioned above, the controller will again shut off water flow. The controller will record this as a second flow alert or count. The controller will again automatically reopen the valve 16 for a second time, after the second pre-selected period of time passes. If after being opened again for the second time, water still continues to flow past the flow sensor for the first pre-selected time limit, the controller will shut off water flow for a third, final or permanent time. At this time, an alarm will sound and/or be sent to a remote location or pager. A warning may also be shown on the display 15. After this third or final time, an authorization code will have to be entered into the system to reset the controller and system 10 to its starting position.

The system 10 may be powered by house current or by a dc battery, which is rechargeable, held in the housing 11 and electrically connected to the controller and valve operating system. The control display 15 in housing 11 may take any desired form so long as it clearly shows the status of the system. For example, the display may show NORMAL if the valve 16 is open, the power to the system is adequate and the system operating normally. Other items that may appear on the display include, but are not limited to, LOW BATTERY, if an internal battery is used and low; FLOW ALERT if a leak or water flow problem is detected; RESET ENABLE, to indicate that a reset button is functional; and SHUT DOWN, to indicate final or permanent shut down of the system after the valve 16 is closed for a third time and the toilet or urinal no longer operable until repairs are made or the system reset.

When the correct code is entered and the system repaired or reset and no further leakage is detected or the water level in the toilet bowl or urinal 14 falls below the level of the sensors 12, the valve 16 will remain open, and water will again be allowed to flow through water line 13, if the flush valve 18 is operated.

Figure 5:
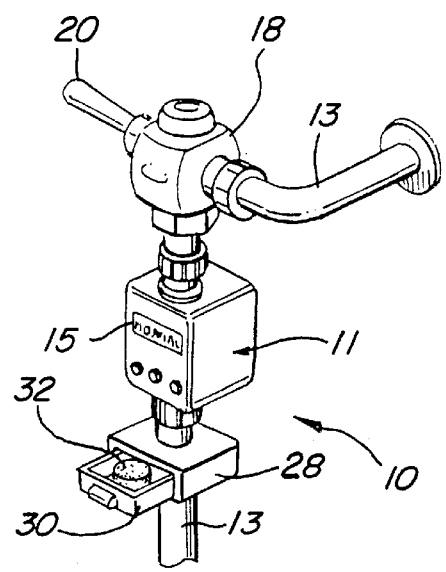
FIG. 5 is a perspective view of a further embodiment of a leak, overflow and stuck valve prevention system of the present invention.

A second embodiment of the invention, as shown in FIG. 5, is also for use with toilets or urinals having no water tanks. In this embodiment, a replaceable cleaner/disinfectant/ cartridge holder 28 may be formed integrally with the housing 11, or may inserted in the waterline 13 leading to the toilet bowl or urinal, before or after flush valve 18. The water cleaner cartridge holder 28 is preferably sealing held in place in the water line 13 or housing 11, and includes means 30, such as a removable or slidable compartment, to allow a water cleaning/disinfectant cartridge or tablet 32 to be inserted therein for cleaning water flowing therethrough.

When the valve 16 in housing 11 moves to the closed position, preferably an alarm, a local overflow light and/or an RF-operated battery-operated remote light for the hearing impaired will be actuated. Additionally, the circuit may include a relay connected to an auto dialer to alert a pager or telephone system that a problem exists.

The water leak detectors or sensors 12 may be mounted within the toilet bowl or urinal in any desirable manner, as by being hung over a rim, attached internally at the rim, or formed integrally with the toilet bowl or urinal. However, the leak detectors or sensors 12 must be held in a position to allow them to easily sense a potential overflow water condition.

If a leak alarm and a leak alarm light are contained in the housing 18, they will be turned on if the valve 16 is actuated to shut off water flow to the toilet bowl or urinal 14. The alarm may be turned off, if desired, and the leak repaired, and/or a stuck flush valve 18 may be closed or repaired. Also, if the valve 16 is closed, an open valve button may be pressed to open the valve to allow water to flow to the toilet bowl or urinal 14 for a further cycle.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A combination overflow control and water flow sensor system for a toilet bowl or urinal, comprising:
    a first detector in the toilet bowl or urinal for detecting the level of water in the toilet bowl or urinal;
    the first detector including means activated by rising and falling levels of water in the toilet bowl or urinal;
    a water flow sensor held in a water line to the toilet bowl or urinal for detecting water flow; and
    a normally open valve means connected to the first detector and the water flow sensor for controlling the flow of water to the toilet bowl or urinal when actuated by either the first detector or the water flow sensor.

2. The combination overflow control and water flow sensor system of claim 1 wherein the first detector is adjustably mounted on holding means removably held in the toilet bowl or urinal.

3. The combination overflow control and water flow sensor system of claim 2 wherein the first detector is secured in the toilet bowl or urinal.

4. The combination overflow control and water flow sensor system of claim 3 wherein the water flow sensor is a light sensing or mechanical means.

5. The combination overflow and water flow sensor system of claim 4 wherein the first detector is integrally formed with the toilet bowl or urinal.

6. The combination overflow control and water flow sensor system of claim 5 wherein the normally open valve means is held in a housing secured in a water line between a flush valve and the toilet bowl or urinal.

7. The combination overflow control and water flow sensor system of claim 1 wherein the water flow sensor is secured in a water line leading to a toilet bowl or urinal and the first detector is secured in the toilet bowl or urinal.

8. The combination overflow control and water flow sensor system of claim 7 wherein the water flow sensor is a rotatable blade or turbine.

9. The combination overflow control and water flow sensor system of claim 8, further including a water cleaning/ disinfectant cartridge holder in the water line.

10. The combination overflow control and water flow sensor system of claim 7 wherein the valve means is held in a housing having the water flow sensor secured therein.

11. The combination overflow control and water flow sensor system of claim 10 wherein the housing is incorporated in a flush valve.

12. The combination overflow control and water flow sensor system of claim 11 wherein the normally open valve means is a gear actuated ball valve.

13. The combination overflow control and water flow sensor system of claim 11 wherein the normally open valve means is a solenoid actuated ball valve.

14. The combination overflow control and water flow sensor system of claim 11 wherein the water flow sensor system is selected from the group comprised of infrared sensing, light sensing or mechanical means.

15. A combination overflow control and water flow sensor system for a toilet bowl or urinal, comprising:
    the toilet bowl or urinal having a water line connected thereto;
    a microprocessor for operating a normally-open valve, including an electrical power source, all held in a housing, said housing connected in the water line between a flush valve and the toilet bowl or urinal;
    at least one water level detector mounted in the toilet bowl or urinal;
    means for connecting the at least one water level detector to the microprocessor; and
    a water flow sensor held in the housing and cooperating with the microprocessor for controlling the flow of water through the housing into the toilet bowl or urinal, whereby if either the at least one water level detector or the water flow sensor detects flow of water for a pre-determined period of time a signal is sent to the microprocessor to close the normally-open valve.

16. The combination overflow control and water flow sensor system of claim 15 wherein the at least one water level detector is adjustably held in the toilet bowl or urinal.

17. The combination overflow control and water flow sensor system of claim 16 wherein the water flow sensor is a blade or turbine rotated by water passing therethrough.

18. The combination overflow control and water flow sensor system of claim 17, further including a water cleaning/disinfectant cartridge holder in the water line.

19. The combination overflow control and water flow sensor system of claim 18 wherein the normally open valve means is a ball valve.

20. A combination overflow control and water flow sensor system for a toilet bowl or urinal, comprising:
    the toilet bowl or urinal having a water line connected thereto;
    a microprocessor for operating a normally-open valve, including an electrical power source, all held in a housing, said housing connected in the water line between a flush valve and the toilet bowl or urinal;
    a plurality of water level detectors mounted adjacent the rim in the toilet bowl or urinal;
    the plurality of water level detectors being electrically connected to the microprocessor; and
    a water flow sensor comprised of a rotatable blade or turbine held in the housing and cooperating with the microprocessor for controlling the flow of water through the housing into the toilet bowl or urinal, whereby if either the plurality of water level detectors or the water flow sensor detects flow of water for a predetermined period of time a signal is sent to the microprocessor to close the normally-opened valve.

* * * * *